United States Patent [19]

Sagara

[11] Patent Number: 4,612,295

[45] Date of Patent: Sep. 16, 1986

[54] GLASS FOR EYE GLASS LENS

[75] Inventor: Hiroji Sagara, Tokyo, Japan

[73] Assignee: Hoya Corporation, Tokyo, Japan

[21] Appl. No.: 604,224

[22] Filed: Apr. 26, 1984

[30] Foreign Application Priority Data

Jul. 14, 1983 [JP] Japan .................................. 58-126908

[51] Int. Cl.⁴ .................... C03C 4/00; C03C 3/064; C03C 3/068; C03C 3/155
[52] U.S. Cl. ................................. 501/51; 501/45; 501/46; 501/47; 501/49; 501/52; 501/77; 501/78; 501/79; 501/901; 501/903
[58] Field of Search .............. 501/903, 49, 50, 51, 501/52, 77, 78, 79, 901, 45, 46, 47

[56] References Cited

U.S. PATENT DOCUMENTS

| | | | |
|---|---|---|---|
| 3,958,999 | 5/1976 | Izumitani et al. | 501/51 |
| 4,055,435 | 10/1977 | Sagara | 501/903 |
| 4,166,746 | 9/1979 | Ishibashi et al. | 501/51 |
| 4,400,473 | 8/1983 | Mennemann et al. | 501/903 |

FOREIGN PATENT DOCUMENTS

| | | | |
|---|---|---|---|
| 2820940 | 11/1978 | Fed. Rep. of Germany | 501/901 |
| 53-16718 | 2/1978 | Japan | 501/903 |
| 2083016 | 3/1982 | United Kingdom | 501/903 |

*Primary Examiner*—Mark L. Bell
*Attorney, Agent, or Firm*—Oblon, Fisher, Spivak, McClelland & Maier

[57] ABSTRACT

A glass for an eye glass lens comprising a $SiO_2$ (or $B_2O_3$)—$CaO$—$Nb_2O_5$ system as a basic system and having a refractive index of 1.79 or more, an Abbe number of 32 to 38 and a specific gravity of less than 3.6 is disclosed.

2 Claims, No Drawings

GLASS FOR EYE GLASS LENS

FIELD OF THE INVENTION

The present invention relates to a glass composition for an eye glass lens having a refractive index (nd) of 1.79 or more, an Abbe number (νd) of 32 to 38 and a specific gravity of less than 3.6.

BACKGROUND OF THE INVENTION

The correction of eye glass lenses depends on the refractive index and the curvatures of both surfaces of the lens but when the degree of myodia or hypermetropia advances, the thickness of the lens for correcting it increases at the outer edge portion or the center portion and hence the appearance is spoiled and the lens becomes heavy in weight to give unpleasant feeling to the user. This problem can be improved by increasing the refractive index of glass material. However, if the refractive index of the glass increases, the specific gravity of the glass generally tends to increase. Therefore, a glass having a high refractive index and a low specific gravity has been demanded and such a glass is disclosed in, for example, Japanese Patent Publication No. 51141/81 and Japanese Patent Application (OPI) No. 126549/80. However, the glass disclosed therein contains a large amount of $TiO_2$ to obtain a low specific gravity and, as a result, has a small Abbe number.

Therefore, the glass has the disadvantage that the chromatic aberration at the outer edge portion thereof is large when the glass is used as an eye glass lens. In particular, when the glass is used as an eye glass lens having a high diopter value, the chromatic aberration becomes a serious problem.

For the above reasons, a light weight glass having a high refractive index and simultaneously a large Abbe number is demanded.

SUMMARY OF THE INVENTION

An object of the present invention is to provide a glass for an eye glass lens having a refractive index (nd) of 1.79 or more, a relatively large Abbe number (νd) of 32 to 38 and a specific gravity of less than 3.6.

The glass according to the present invention comprises, in % by weight, 22 to 36% $SiO_2+B_2O_3$;
0 to 36% $SiO_2$;
0 to 36% $B_2O_3$;
16 to 42% $CaO+MgO$;
8 to 42% $CaO$;
0 to 22% $MgO$;
14 to 36% $TiO_2+Nb_2O_3$;
0 to 19% $TiO_2$;
1 to 35% $Nb_2O_5$;
0 to 13% $ZrO_2$;
0 to 14% $La_2O_3$;
0 to 17% $Y_2O_3$;
0 to 10% $Gd_2O_3$;
0 to 10% $Ta_2O_5$;
0 to 12% $WO_3$;
0 to less than 5% $Li_2O+Na_2O+K_2O$;
0 to 14% $BaO$;
0 to 16% $SrO$;
0 to 14% $ZnO$;
0 to 14% $Al_2O_3$; and
0 to 10% $P_2O_5$, wherein the total amount of the trivalent or more components is at least $1.05\times(SiO_2+B_2O_3+Al_2O_3+P_2O_5+$ alkali metal oxides).

DETAILED DESCRIPTION OF THE INVENTION

The present invention is based on the discovery that a $SiO_2$ (or $B_2O_3$)-$CaO$-$Nb_2O_5$ system glass as a basic system wherein the ratio between the trivalent or more oxide which is the component to increase the refractive index and the glass former and alkali metal oxide which are the component to decrease the refractive index is strictly limited and also the component which increases the Abbe number and the component which increases the specific gravity are limited to the specific ranges is suitable for the object of the present invention.

$SiO_2$ and $B_2O_3$ are the components comprising the skeleton of the glass. If the total amount thereof is higher than 36% by weight, the desired high refractive index cannot be obtained and on the other hand, if the total amount thereof is less than 22% by weight, a glass having the desired low weight cannot be obtained.

CaO is the component necessary to increase the stability of the glass toward devitrification and must be present in an amount of at least 8% by weight. However, if the amount thereof is higher than 42% by weight, the glass shows a strong tendency toward devitrification.

MgO can be substituted with CaO without increasing the specific gravity of the glass. If the amount of MgO is higher than 22% by weight, a devitrification tendency of the glass increases.

The total amount of MgO and CaO must be within the range of from 16 to 42% by weight.

$TiO_2$ and $Nb_2O_5$ are the component useful to obtain a glass having a high refractive index and a low specific gravity and the total amount thereof must be at least 14% by weight. However, due to the disadvantage of those components that an Abbe number of a glass is decreased, the amount of $TiO_2$ must be limited to 19% by weight or less, the amount of $Nb_2O_5$ must be limited to 35% by weight or less and the total amount thereof must be limited to 36% by weight or less. Further, $Nb_2O_5$ is the essential component and must be present in an amount of 1% by weight or more to prevent devitrification of a glass.

Other components are not necessarily essential and are added for the purpose of improving meltability in batch, devitrification resistance or moldability and adjusting optical constants.

However, if the amounts of $ZrO_2$, an alkali metal oxide, $Al_2O_3$ and $P_2O_5$ are higher than 13% by weight, 5% by weight, 14% by weight and 10% by weight, respectively, a devitrification of a glass rapidly deteriorates.

BaO, SrO, ZnO, $La_2O_3$, $Y_2O_3$, $Gd_2O_3$, $Ta_2O_5$ and $WO_3$ which are the component to increase a specific gravity of a glass, should not be added in amounts higher than 16% by weight, 14% by weight, 15% by weight, 17% by weight, 10% by weight, 10% by weight and 12% by weight, respectively.

The total amount of trivalent or more components must be $1.05\times(SiO_2+B_2O_3+Al_2O_3+P_2O_5+$ alkali metal oxide) or more.

Small amounts of $As_2O_3$, $Sb_2O_3$, $F_2$, $GeO_2$ and PbO can be added to the glass composition of the present invention to improve purification and meltability in a range which does not degrade the characteristics of the glass.

According to the preferred embodiment of the present invention, the total amount of $SiO_2$ and $B_2O_3$ is limited to 33% by weight or less to obtain a glass having a high refractive index and 26% by weight or more to obtain a glass having a low specific gravity. However, in view of the fact that a chemical durability of a glass deteriorates with increasing the proportion of $B_2O_3$, it is preferred that the amount of $B_2O_3$ is 0 to 15% by weight and the amount of $SiO_2$ is 15 to 33% by weight.

To obtain a glass having a particularly excellent devitrification resistance, the total amount of $CaO+MgO$ and the total amount of $TiO_2+Nb_2O_5$ each is 20 to 30% by weight, with proviso of 12 to 36% by weight CaO, 0 to 15% by weight MgO, 4 to 16% by weight $TiO_2$ and 4 to 30% by weight $Nb_2O_5$.

$ZrO_2$ has a large devitrification preventing effect and is effective to provide a glass of a low dispersion as compared with $TiO_2$ and $Nb_2O_5$. The preferred amount of $ZrO_2$ is 2 to 10% by weight.

$La_2O_3$ and $Y_2O_3$ are effective to provide a glass of a low dispersion as compared with $TiO_2$, $Nb_2O_5$ and $ZrO_2$ and are the component advantageous to obtain a glass having a large Abbe number. On the other hand, those components increase a specific gravity of a glass. It is therefore preferred that the amount of $La_2O_3$ is 0 to 10% by weight, the amount of $Y_2O_3$ is 0 to 14% by weight and the total amount thereof is 0 to 14% by weight.

$Li_2O$, $Na_2O$ and $K_2O$ are effective to improve a meltability of a glass in batch and it is preferred from the standpoint of a devitrification resistance that the total amount thereof is 4% by weight or less.

BaO, SrO and ZnO are effective to improve a devitrification resistance but each increases a specific gravity of a glass. Therefore, it is preferred that the total amount thereof is 10% by weight.

It is preferred that the total amount of trivalent or more components is at least $1.05 \times (SiO_2 + B_2O_3 + $ alkali metal oxide) to maintain the desired high refractive index.

Accordingly, the most advantageous embodiment of the present invention is a glass composition having a refractive index (nd) of 1.795 or more, an Abbe number ($\nu d$) of 32 to 36 and a specific gravity of 3.55 or less, which comprises, in % by weight, 26 to 36% $SiO_2+B_2O_3$;
15 to 33% $SiO_2$;
0 to 15% $B_2O_3$;
20 to 36% $CaO+MgO$;
12 to 36% CaO;
0 to 15% MgO;
20 to 36% $TiO_2+Nb_2O_5$;
4 to 16% $TiO_2$;
4 to 30% $Nb_2O_5$;
2 to 10% $ZrO_2$;
0 to 14% $La_2O_3+Y_2O_3$;
0 to 10% $La_2O_3$;
0 to 14% $Y_2O_3$;
0 to 4% $Li_2O+Na_2O+K_2O$; and
0 to 10% $BaO+SrO+ZnO$ wherein the total amount of the trivalent or more oxides is at least $1.05 \times (SiO_2+B_2O_3+$alkali metal oxides).

Examples of the glass compositions of the present invention are shown in the following table together with the properties thereof, wherein the components are shown by weight %.

TABLE 1

| No | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| $SiO_2$ | 30.1 | | 22.3 | 12.6 | 20.6 | 23.7 | 25.6 | 23.7 | 27.6 | 22.3 | 22.3 | 25.6 | 22.6 | 22.0 | 22.3 | 21.3 | 27.6 | 24.6 | 12.6 |
| $B_2O_3$ | | 31.7 | 6.0 | 19.1 | 4.1 | | 4.0 | 4.0 | 4.1 | 7.0 | 7.0 | 4.3 | 8.0 | 8.0 | 8.0 | 8.0 | 4.1 | 4.1 | 16.1 |
| CaO | 25.5 | 28.4 | 19.9 | 28.4 | 20.4 | 30.6 | 28.4 | 28.4 | 26.4 | 22.9 | 22.9 | 28.1 | 33.6 | 33.6 | 34.9 | 38.4 | 28.4 | 10.4 | 31.4 |
| MgO | | | 15.0 | | | | | | | | | | | | | | | 13.0 | |
| $TiO_2$ | 10.5 | 4.9 | 15.4 | 4.9 | 11.0 | 11.0 | 11.0 | 11.0 | 7.0 | 15.4 | 15.4 | 11.0 | 14.0 | 14.0 | 15.4 | 11.4 | 4.9 | 7.0 | |
| $Nb_2O_5$ | 16.5 | 28.2 | 7.6 | 28.2 | 16.0 | 16.0 | 16.8 | 16.0 | 24.0 | 7.6 | 7.6 | 5.0 | 10.0 | 10.0 | 7.6 | 15.6 | 28.2 | 24.0 | 28.2 |
| $Al_2O_5$ | | | | | 7.0 | | | | | | | | | | | | | | |
| $P_2O_5$ | | | | | | 5.8 | | | | | | | | | | | | | |
| $ZrO_2$ | 9.8 | 2.0 | 7.8 | | 6.8 | 7.8 | 6.0 | 6.8 | 6.8 | 7.8 | 7.8 | 6.8 | 1.8 | 2.4 | 7.8 | 5.3 | 6.8 | 6.8 | 6.0 |
| $Li_2O$ | 4.0 | | | | | | | | | | | | | | | | | | |
| $Na_2O$ | | | | | | | 2.0 | | | | | | | | | | | | |
| $K_2O$ | | | | | | | | 4.0 | | | | | | | | | | | |
| BaO | | | | | | | | | | | | 12.0 | | | | | | | |
| SrO | | | | | | | | | | | 12.0 | | | | | | 6.0 | | |
| ZnO | | | | | 8.0 | | | | 2.0 | | | | | | | | 2.0 | | |
| $La_2O_3$ | 3.6 | 4.8 | 6.0 | 6.8 | 6.1 | 5.1 | | 6.1 | 2.1 | 5.0 | 5.0 | 7.1 | 3.0 | 3.0 | 4.0 | | | 2.1 | 5.7 |
| $Y_2O_3$ | | | | | | | | | | | | | 12.1 | | | | | | |
| $Gd_2O_3$ | | | | | | | 6.2 | | | | | | | | | | | | |
| $Ta_2O_5$ | | | | | | | | | | | | | | 7.0 | | | | | |
| $WO_3$ | | | | | | | | | | | | | | | 7.0 | | | | |
| A*1 | 35.8 | 33.3 | 29.7 | 33.3 | 33.3 | 31.0 | 33.2 | 33.3 | 33.3 | 30.8 | 30.8 | 31.4 | 32.1 | 31.5 | 31.8 | 30.8 | 33.3 | 30.1 | 30.1 |
| B*2 | 40.4 | 39.9 | 36.8 | 39.9 | 39.9 | 39.9 | 40.0 | 39.9 | 39.9 | 35.8 | 35.8 | 42.0 | 35.8 | 36.4 | 34.8 | 32.3 | 39.9 | 39.9 | 39.9 |
| $\eta d$ | 1.800 | 1.805 | 1.801 | 1.799 | 1.817 | 1.804 | 1.798 | 1.793 | 1.803 | 1.810 | 1.806 | 1.790 | 1.796 | 1.797 | 1.798 | 1.797 | 1.800 | 1.801 | 1.795 |
| $\nu d$ | 33.8 | 34.8 | 33.6 | 34.3 | 32.2 | 33.6 | 33.3 | 33.5 | 33.3 | 32.8 | 33.1 | 37.0 | 33.6 | 33.2 | 33.9 | 34.5 | 33.6 | 33.7 | 36.9 |
| Specific gravity | 3.42 | 3.41 | 3.44 | 3.46 | 3.59 | 3.50 | 3.48 | 3.44 | 3.48 | 3.59 | 3.55 | 3.56 | 3.44 | 3.43 | 3.36 | 3.34 | 3.44 | 3.59 | 3.52 |

*1 $A = \Sigma (SiO_2 + B_2O_3 + Al_2O_3 + P_2O_5 + Li_2O + Na_2O + K_2O) \times 1.05$
*2 $B = \Sigma (TiO_2 + Nb_2O_5 + La_2O_3 \; Y_2O_3 + Gd_2O_3 + Ta_2O_5 + WO_3)$ These glasses of the present invention can be produced by melting a mixture of starting materials which are conventionally used such as siliceous stone powder, boric acid, calcium carbonate, magnesium carbonate, titanium oxide and niobium oxide in a platinum crucible at 1,300° to 1,400° C. followed by stirring to sufficiently homogenize the mixture and remove bubbles, casting the molten mixture into a metallic mold which has been pre-heated at an appropriate temperature, and the annealing the product.

While the invention has been described in detail and with reference to specific embodiments thereof, it will be apparent to one skilled in the art that various changes and modifications can be made therein without departing from the spirit and scope thereof.

What is claimed is:

1. A glass for an eye glass lens having a refractive index of 1.79 or more, an Abbe number of 32 to 38 and a specific gravity of less than 3.6, consists essentially of, in % by weight, 22 to 36% $SiO_2+B_2O_3$;
0 to 36% $SiO_2$;
0 to 36% $B_2O_3$;
16 to 42% $CaO+MgO$;
8 to 42% $CaO$;
0 to 22% $MgO$;
14 to 36% $TiO_2+Nb_2O_5$;
0 to 19% $TiO_2$;
1 to 35% $Nb_2O_5$;
0 to 13% $ZrO_2$;
0 to 14% $La_2O_3$;
0 to 17% $Y_2O_3$;
0 to 10% $Gd_2O_3$;
0 to 10% $Ta_2O_5$;
0 to 12% $WO_3$;
0 to less than 5% $Li_2O+Na_2O+K_2O$;
0 to 14% $BaO$;
0 to 16% $SrO$;
0 to 14% $ZnO$;
0 to 14% $Al_2O_3$; and
0 to 10% $P_2O_5$, wherein the total amount of the trivalent or more oxides at least $1.05\times(SiO_2+B_2O_3+Al_2O_3+P_2O_5+$alkali metal oxides).

2. A glass for an eye glass lens as claimed in claim 1, wherein the glass has a refractive index of 1.795 or more, an Abbe number of 32 to 36 and a specific gravity of 3.55 or which consists essentially of, in % by weight, 26 to 33% $SiO_2+B_2O_3$;
15 to 33% $SiO_2$;
0 to 15% $B_2O_3$;
20 to 36% $CaO+MgO$;
12 to 36% $CaO$;
0 to 15% $MgO$;
20 to 36% $TiO_2+Nb_2O_5$;
4 to 16% $TiO_2$;
4 to 30% $Nb_2O_5$;
2 to 10% $ZrO_2$;
0 to 14% $La_2O_3+Y_2O_3$;
0 to 10% $La_2O$;
0 to 14% $Y_2O_3$;
0 to 4% $Li_2O+Na_2O+K_2O$; and
0 to 10% $BaO+SrO+ZnO$, wherein the total amount of the trivalent or more oxides is at least $1.05\times(SiO_2+B_2O_3+$alkali metal oxides).

* * * * *